Jan. 18, 1966   J. J. CADWELL   3,229,996
DISCONNECTABLE TUBE COUPLING
Filed June 17, 1963
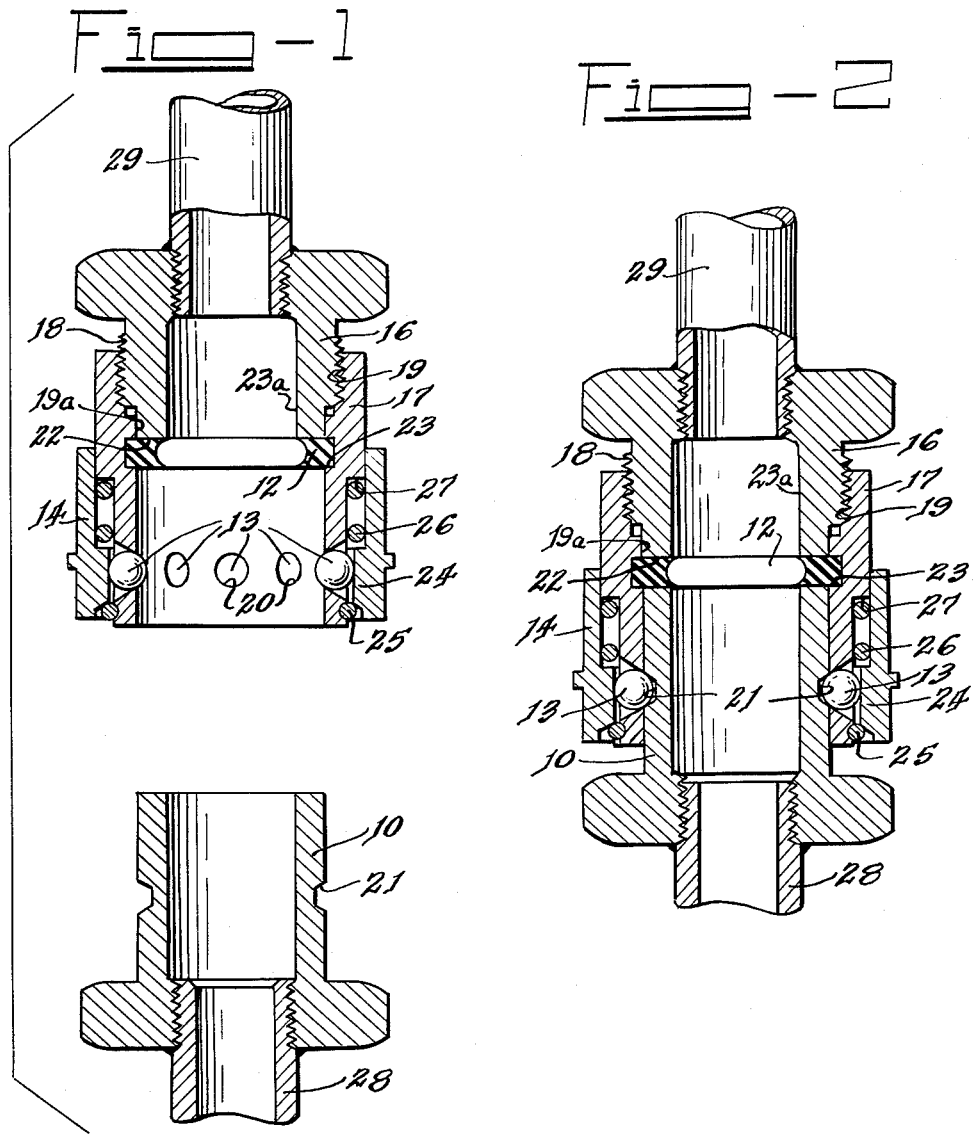
INVENTOR.
Jerry J. Cadwell
BY
Richard A. Anderson
Attorney

United States Patent Office 3,229,996
Patented Jan. 18, 1966

3,229,996
DISCONNECTABLE TUBE COUPLING
Jerry J. Cadwell, San Diego, Calif., assignor to the United States of America as represented by the United States Atomic Energy Commission
Filed June 17, 1963, Ser. No. 288,573
1 Claim. (Cl. 285—110)

The invention described herein was made in the course of, or under, a contract with the U.S. Atomic Energy Commission.

This invention relates to a quickly disconnectable tube coupling. More specifically, the invention relates to an adjustable coupling of this type that can handle a wide range of gasket pressures.

Quickly disconnectible couplings are widely used on chemical-process lines where the need is for connections and disconnections to be made rapidly and with minimum manipulative complexity. In cases where leakage is intolerable, quickly disconnectable couplings have had only limited use, because of their tendency to leak. Moreover, there is the problem of adapting a coupling to the higher loadings dictated by the relatively great hardness of certain materials having adequate chemical, thermal, or radiation resistance.

The tube coupling of the present invention can be quickly connected and disconnected by a minimum of manipulation and at the same time is readily adjustable to exert a wide range of gasket pressures. Thus the coupling is leak-proof and is suited to both hard and soft gasket materials.

In the drawing:

FIG. 1 is a longitudinal section showing the novel coupling of the present invention in disconnected condition; and FIG. 2 is a longitudinal section showing the coupling in connected condition.

The coupling of the present invention comprises a male member 10, a gasket ring 12, a set of balls 13, a male member 16, a female member 17, and a retainer 14 for the balls to make them connect the members 10 and 17 to one another.

A significant feature of the present invention is that the members 16 and 17 have an adjustable threaded connection with one another and so enable the gasket ring 12 to be clamped with increased pressure for a more effective seal against leakage in the coupling. Another important feature is that the balls 13 act as a ball bearing during rotation of the members 16 and 17 with respect to one another when pressure on the gasket ring 12 is being increased.

The male member 16 has an external screw thread 18 engaging an internal screw thread in a region 19 at one end of the female member 17, which region is a counterbore to a bore 19a. Adjacent the other end, female member 17 is provided with a plurality of peripherally spaced recesses 20 which contain the balls 13 and are of such size as to permit them to project into an external groove 21 in the male member 10 without escaping from the recesses 20 into the groove 21.

The inner end of the male member 16 lying in the female member 17 constitutes an internal shoulder 22 abutting the gasket ring 12. An internal groove 23 located at an intermediate region of the part 17 is immediately adjacent the shoulder 22 and snugly receives the gasket ring 12 so as to keep it at the shoulder 22. The inner end of the gasket ring 12 is dimensioned to terminate adjacent the wall of the end of a fluid passage 23a extending through the male member 16.

The retainer 14 has an internal peripheral land or rib 24 which engages the balls 13 to keep them in the groove 21 in the male member 10. A snap ring 25, located in an external groove in the female member 17, is engageable with one end of the rib 24 of the retainer 14 to hold it on the member 17. A coil spring 26, located between the retainer 14 and the member 17, acts between an external shoulder 27 on the member 17 and an end of the land 24 to urge the retainer 14 downward as viewed in the figures. The spring 26 and snap ring 25, acting against opposite ends of the land 24, position the land so that it keeps the balls 13 on the groove 21 of the member 10 and the members 10 and 17 locked together.

When the members 10 and 17 are to be connected or disconnected the retainer 14 is moved upward as viewed in the figures. Thus, the balls 13 can move outward along the lower end of the land 24 as the member 10 is moved in or out of the member 17.

As shown, the members 10 and 16 have leak-proof, threaded, soldered connections with chemical-process lines 28 and 29.

The gasket ring 12, which is circular and fluid-pressure-actuated, may be of a hard material such as polyfluortetraethylene resin, an asbestos composition, gold, copper, lead, tin, or tantalum, or of a soft material such as soft rubber.

Before the members 10 and 17 are to be connected, the members 16 and 17 are adjusted so that the member 10 can be inserted in the member 17 to bring its groove 21 in position to receive the balls 13, without exerting great force against the gasket ring 22. After the members 10 and 11 are brought together and the balls 13 are locked in the groove 21 by the land 24 of the retainer 14, the pressure between the member 10 and the sealing ring 22 is increased to the value needed for effective sealing, dependent on the material of the sealing ring. This pressure increase is carried out by relative rotation of members 16 and 17. As a result, the member 17 shifts slightly and acts through the balls 13 to shift the member 10 slightly against the gasket ring 22, thus being pressed with greater force against the gasket ring. While the part 17 is being rotated to increase the sealing pressure, the inner member 10 is, of course, kept from rotating by the process line 28, but the balls 13 serve as a ball bearing facilitating rotation of the part 17.

When the members 10 and 17 are to be disconnected, the member 17 is rotated to decrease the sealing pressure between the sealing ring 22 and the member 10. This eases the pressure of the balls 13 against the members 10 and 17 so that the balls move outward more readily when the retainer 14 is lifted and the member 10 is moved out of the member 17.

If the sealing ring 22 is made of a soft material like soft rubber, it is unnecessary to adjust the member 17 after connection of members 10 and 17 or before disconnection thereof.

It is also understood that the invention is not to be limited by the details given herein but that it may be modified within the scope of the appended claim.

The embodiments of the invention in which an exclusive property or privilege is claimed are defined as follows:

A quick-disconnect coupling for tubes comprising
(1) a female member having at one end a bore and a counterbore,
internal threads in said counterbore, an annular groove formed in the walls of said bore adjacent said counterbore, and a plurality of peripherally spaced openings adjacent the other end of said female member;
(2) a first male member threaded into said counterbore and having a fluid passage therethrough,
the inner end of said first male member forming a shoulder adjacent one side of said groove;

(3) a fluid-pressure-actuated annular gasket ring snugly received in said groove,
 the inner edge of said gasket ring being dimensioned to terminate adjacent the wall of the end of said passage in said first male member,
 said shoulder engaging one of the radial sides of said gasket in laterally supporting relation thereto;
(4) a second male member inserted in the said other end of the female member so as to have one end abutting the other radial side of said gasket ring in laterally supporting relation thereto, the second male member having an external peripheral groove registering with the openings in the female member;
(5) a plurality of balls located in said openings;
(6) a retainer embracing said female member and having an internal rib engageable with the balls so as to keep them projecting through the said openings into the groove in the second male member;
(7) and a spring acting between the retainer and the said female member for yieldingly holding the rib of the retainer in engagement with the balls;

whereby upon movement of the retainer to ball holding position the balls are forced into the groove in the second male member and shift it against the gasket ring, and also the balls act as a bearing between the female member and the second male member when the first male member is rotated with respect to the female member so as to be moved toward the second male member for increasing the pressure of the male members against the gasket ring.

References Cited by the Examiner

UNITED STATES PATENTS

| | | | |
|---|---|---|---|
| 2,518,542 | 8/1950 | Hansen | 285—277 |
| 2,744,770 | 5/1956 | Davidson | 285—316 |

FOREIGN PATENTS 587,237  1/1959  Italy.

EDWARD C. ALLEN, *Primary Examiner.*

CARL W. TOMLIN, *Examiner.*